US006037953A

United States Patent [19]

Mizutani

[11] Patent Number: 6,037,953

[45] Date of Patent: Mar. 14, 2000

[54] GRAPHIC DISPLAY METHOD AND DEVICE FOR HIGH-SPEED DISPLAY OF A PLURALITY OF GRAPHICS

[75] Inventor: Kenichi Mizutani, Kanagawa, Japan

[73] Assignee: NEC Corporation, Tokyo, Japan

[21] Appl. No.: 09/021,760

[22] Filed: Feb. 11, 1998

[30] Foreign Application Priority Data

Feb. 12, 1997 [JP] Japan .................................... 9-028058

[51] Int. Cl.[7] ....................................................... G06F 13/00

[52] U.S. Cl. .......................... 345/523; 345/196; 345/213; 345/501

[58] Field of Search .................................... 345/523–525, 345/213, 501, 196, 515

[56] References Cited

U.S. PATENT DOCUMENTS

| | | | |
|---|---|---|---|
| 4,823,119 | 4/1989 | Ishii | 345/188 |
| 5,444,845 | 8/1995 | Cho | 395/524 |

FOREIGN PATENT DOCUMENTS

| | | | |
|---|---|---|---|
| 0 192 958 A2 | 9/1986 | European Pat. Off. | G09G 1/16 |
| 0 431 845 A2 | 6/1991 | European Pat. Off. | G09G 1/16 |
| 0 597 218 A1 | 5/1994 | European Pat. Off. | G09G 1/16 |
| 59-128590 | 7/1984 | Japan | G09G 1/06 |
| 60-130795 | 7/1985 | Japan | G09G 1/06 |
| 3-122492 | 12/1991 | Japan | G09G 5/02 |
| 4-21077 | 1/1992 | Japan | G06F 15/66 |
| 9-305164 | 11/1997 | Japan | G09G 5/36 |
| 2 287 627 | 9/1995 | United Kingdom | G06T 1/60 |

*Primary Examiner*—Kee M. Tung

*Attorney, Agent, or Firm*—Scully, Scott, Murphy & Presser

[57] ABSTRACT

A graphics display device includes a drawing processing unit to output a display pixel data signal, a write enable signal and an address signal sequentially with respect to target graphics, starting with a graphics located in the foreground in a positional relationship in the depth direction on a display screen toward a graphics located at the back, a mask unit, when a predetermined region of a target graphics overlaps with other graphics located in the foreground of the target graphics, to mask and output a write enable signal corresponding to the region, a line buffer unit to accumulate and output one line of display pixel data, an address signal and a write enable signal, and a timing generation unit to control operation timing of the drawing processing unit and the line buffer unit.

15 Claims, 11 Drawing Sheets

(A)

(B)

(A)

(B)

GRAPHIC DISPLAY METHOD AND DEVICE FOR HIGH-SPEED DISPLAY OF A PLURALITY OF GRAPHICS

BACKGROUND OF THE INVENTION

1. Field of the Invention

The present invention relates to a graphics display device which displays graphics on a display device by means of a micro-computer and a graphics display method thereof and, more particularly, to a graphics display device suitable for such a system as a game machine which displays a plurality of graphics in motion at high speed, while three-dimensionally overlapping them with each other, and a graphics display method thereof.

2. Description of the Related Art

In recent years, in line with complication and advancement of the contents of games on game machines and dramatic presentation of virtual experiences in various kinds of presentations, there is a demand for various kinds of special functions appealing to perception of game players and viewers more effectively on display images of a graphics display device of this kind. One of such special functions is stereoscopic display. Here, stereoscopic display is referred to as a representation method in which graphics (sprite) in the foreground including a plurality of human characters move and overlap with each other at a high-speed on a three-dimensional scene having a depth to forward a game or a presentation.

In stereoscopic display of this kind realized by a conventional graphics display device, when a plurality of sprite graphics overlap with each other to an extent exceeding a predetermined overdrawing capacity, graphics located in the foreground which correspond to the amount of an overflow from the drawing capacity are not displayed, resulting in making display unnatural, depending on constitution of a scene.

FIG. 7 shows an example of structure of a conventional graphics display device. A conventional graphics display device 30 shown in FIG. 7 includes a drawing processing unit 31 for generating and outputting graphic data, a line buffer unit 33 for accumulating and outputting one line of graphic data output from the drawing processing unit 31, and a timing generation unit 32 for controlling operation timing of the drawing processing unit 31 and the line buffer unit 33. The drawing processing unit 31, having a built-in graphics ROM which stores original data of display graphics, conducts predetermined drawing processing in response to a clock signal CK and a drawing processing control signal CI output from the timing generation unit 32 to output graphic data composed of a display pixel data signal PD, a write enable signal WE to the line buffer unit 33, and an address signal LA indicative of an address of a storage position at the line buffer unit 33. The timing generation unit 32 receives input of the clock signal CK, and a vertical synchronizing signal V and a horizontal synchronizing signal H to output a drawing processing control signal CI for controlling the operation timing of the drawing processing unit 31 and a line buffer control signal LC for controlling the operation timing of the line buffer 33. The line buffer unit 33 temporarily stores graphic data (PD, WE, LA) output from the drawing processing unit 31 in response to the clock signal CK and the line buffer control signal LC output from the timing generation unit 32.

With reference to FIGS. 7, 8 and 9, description will be next made of operation of the conventional graphics display device for displaying a k-th line of graphics. FIG. 8 is a time chart showing each of signal waveforms and FIG. 9 is a diagram showing an example of display of the graphics. In this operation example, graphics G1 and G2 are displayed, with the graphics G1 displayed in the foreground (that is, with a higher display priority) as shown in FIG. 9.

First, the graphics display device 30 is supplied with the vertical synchronizing signal V from a host device (not shown) to initialize the timing generation unit 32. Next, the timing generation unit 32 is supplied with the horizontal synchronizing signal H from the host device once to responsively output the drawing processing control signal CI and the line buffer control signal LC. The drawing processing unit 31 is initialized in response to the drawing processing control signal CI and the line buffer unit 33 is initialized in response to the line buffer control signal LC to enter a drawing starting state.

Upon entering the drawing starting state, the drawing processing unit 31, for first displaying the graphics G2 whose display priority is low, serially outputs the address signal LA="40~47(h)" and the corresponding display pixel data signal PD as a pixel data value for drawing the graphics G2 in response to each clock signal CK. During this period, the value of the write enable signal WE assumes "0(h)", so that the pixel data of the graphics G2 is stored in the line buffer unit 33. Next, the drawing processing unit 31, for displaying the graphics G1 whose display priority is high, serially outputs the address signal LA="45~4C(h)" and the corresponding display pixel data signal PD as a pixel data value for drawing the graphics G1 in response to each clock signal CK. During this period, the value of the write enable signal WE assumes "0(h)", so that the pixel data of the graphics G1 is stored in the line buffer unit 33.

After the one line of pixel data including the graphics G1 and G2 is thus stored in the line buffer unit 33, the pixel data is output to draw each display line of a screen in question on the display device as shown in FIG. 9.

As described in the foregoing, for the stereoscopic display in which a plurality of graphics (sprite graphics) are displayed to have a positional relationship in the depth direction, conventional graphics display devices draw graphics while overlapping them from the back of the screen toward the foreground in order. Then, when the plurality of sprite graphics overlap with each other to an extent exceeding a drawing capacity of the graphics display device, graphics located in the foreground which exceed the drawing capacity are not displayed.

FIGS. 10 and 11 are diagrams showing examples of stereoscopic display in which five graphics G3 to G7 are disposed in order from the foreground toward the back of the screen. FIGS. 10(A) and 11(A) show a positional relationship among the displayed graphics in the depth direction, while FIGS. 10(B) and 11(B) show a state of the actual display. With reference to FIG. 10, the graphics G7 is completely hidden by other graphics, and therefore the four graphics G3 to G6 are displayed in FIG. 10(B). On the other hand, with reference to FIG. 11, the graphics G3 is not displayed because display of the graphics exceeds the drawing capacity of the graphics display device. As a result, each part of the graphics G4, G5 and G7 is exposed which would be hidden by the graphics G3 in FIG. 11(B). In a case where the graphics G3 is a main element of the display scene, such missing of graphics as illustrated in FIG. 11 stands out to make the screen unnatural.

As described in the foregoing, conventional graphics display devices and graphics display methods thereof have a drawback that since in stereoscopic display where a plurality of graphics are displayed overlapping with each other in the depth direction, the graphics are overlapped in order from the back toward the foreground, when graphics display is made exceeding a drawing capacity, graphics located in the foreground will not be displayed and in some cases the missing graphics stands out very much to make the screen unnatural.

SUMMARY OF THE INVENTION

An object of the present invention is to provide a graphics display device capable of making appropriate stereoscopic display without exceeding its drawing capacity even when a plurality of graphics overlap with each other in the depth direction, and a graphics display method thereof.

According to the first aspect of the invention, a graphics display device having a built-in graphics ROM which stores original data of display graphics for appropriately overlapping and drawing a plurality of graphic data having a positional relationship in the depth direction on the same screen, comprises drawing processing means for conducting predetermined drawing processing in response to a clock signal to output a display pixel data signal, a write enable signal and an address signal sequentially with respect to target graphics, starting with a graphics located in the foreground in the positional relationship in the depth direction toward a graphics located at the back, mask means for receiving input of the write enable signal output from the drawing processing means to, when a predetermined region of a target graphics overlaps with other graphics located in the foreground of the target graphics, mask and output the write enable signal corresponding to the region, line buffer means responsive to the clock signal for accumulating and outputting one line of the display pixel data and the address signal output from the drawing processing means and the write enable signal which has passed through the mask means, and timing generation means for controlling operation timing of the drawing processing means and the line buffer means based on the clock signal, and a vertical synchronizing signal and a horizontal synchronizing signal.

The mask means, when it receives input of the write enable signal corresponding to first of the display pixel data for a predetermined region of a display screen, outputs the write enable signal without masking, and when it receives input of the write enable signal corresponding to the display pixel data for a region where the display pixel data already exists, masks the write enable signal.

In the preferred construction, the graphics display device further comprises status register means whose operation timing is controlled by the timing generation means for controlling the mask means based on the clock signal and the address signal, wherein the status register means, when no address value coincident with an address value of applied the address signal is stored, controls the mask means to output applied the write enable signal without masking, as well as storing the address value of the address signal, and when the address value of applied the address signal coincides with an already stored address value, controls the mask means to mask applied the write enable signal.

In the preferred construction, the mask means compares a value of predetermined display pixel data set in advance and a value of display graphic data output from the line buffer means, outputs applied the write enable signal without masking when the values of both the data coincide with each other, and masks applied the write enable signal when the values of both the data fail to coincide with each other.

In another preferred construction, the mask means compares a value of the display pixel data corresponding to a transparent color and a value of display graphic data output from the line buffer means, outputs applied the write enable signal without masking when the values of both the data coincide with each other, and masks applied the write enable signal when the values of both the data fail to coincide with each other.

According to the second aspect of the invention, a graphics display method of appropriately overlapping and drawing a plurality of graphic data having a positional relationship in the depth direction on the same screen, comprising the steps of:

conducting predetermined drawing processing in response to a clock signal to output a display pixel data signal, a write enable signal and an address signal sequentially with respect to target graphics, starting with a graphics located in the foreground in the positional relationship in the depth direction toward a graphics located at the back;

receiving input of the write enable signal output at the drawing processing step to, when a predetermined region of a target graphics overlaps with other graphics located in the foreground of the target graphics, mask and output the write enable signal corresponding to the region; and accumulating and outputting one line of the display pixel data and the address signal output at the drawing processing step and the write enable signal which has been subjected to the write enable signal masking step in response to the clock signal.

In the preferred construction, the write enable signal masking step comprises the steps of:

determining whether applied the write enable signal is the write enable signal corresponding to first of the display pixel data for a predetermined region of a display screen, and when applied the write enable signal corresponds to first of the display pixel data for the predetermined region, outputting the write enable signal without masking, and when applied the write enable signal corresponds to the display pixel data for a region where the display pixel data already exists, masking the write enable signal.

In the preferred construction, the write enable signal masking step comprises the steps of:

receiving input of the address signal output at the drawing processing step and comparing an address value of the address signal and an address value at which the display pixel data already exists, and when the address values fail to coincide with each other, outputting applied the write enable signal without masking and when the address values coincide with each other, masking applied the write enable signal.

In the preferred construction, the write enable signal masking step comprises the steps of:

comparing a value of predetermined display pixel data set in advance and a value of display graphic data output from the line buffer means, and outputting applied the write enable signal without masking when the values of both the data coincide with each other, and masking applied the write enable signal when the values of both the data fail to coincide with each other.

In another preferred construction, the write enable signal masking step comprises the steps of:

comparing a value of the display pixel data corresponding to a transparent color and a value of display graphic data output from the line buffer means, and outputting applied the write enable signal without masking when the values of both the data coincide with each other, and masking applied the write enable signal when the values of both the data fail to coincide with each other.

According to another aspect of the invention, a computer readable memory having a graphics display control program for controlling a computer system for appropriately overlapping and drawing a plurality of graphic data having a positional relationship in the depth direction on the same screen, the graphics display control program comprising the steps of:

conducting predetermined drawing processing in response to a clock signal to output a display pixel data signal, a write enable signal and an address signal sequentially with respect to target graphics, starting with a graphics located in the foreground in the positional relationship in the depth direction toward a graphics located at the back;

receiving input of the write enable signal output at the drawing processing step to, when a predetermined region of a target graphics overlaps with other graphics located in the foreground of the target graphics, mask and output the write enable signal corresponding to the region; and accumulating and outputting one line of the display pixel data and the address signal output at the drawing processing step and the write enable signal which has been subjected to the write enable signal masking step in response to the clock signal.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENTS

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Figure 1:
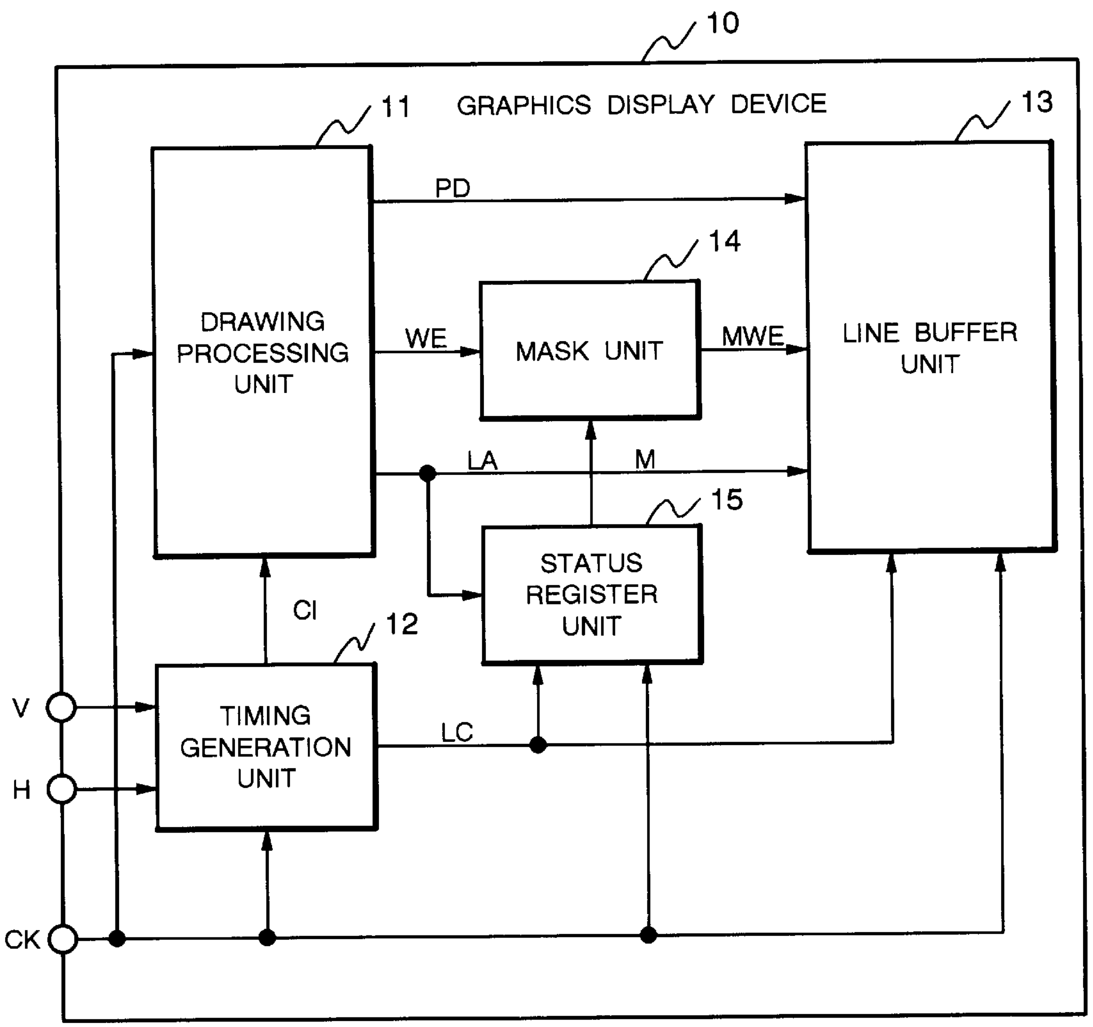
FIG. 1 is a block diagram showing structure of a graphics display device according to one embodiment of the present invention.

FIG. 1 is a block diagram showing structure of a graphics display device according to one embodiment of the present invention. With reference to FIG. 1, a graphics display device 10 of the present embodiment includes a drawing processing unit 11 for generating and outputting graphic data, a line buffer unit 13 for accumulating and outputting one line of graphic data output from the drawing processing unit 11, a mask unit 14 for masking part of graphic data output from the drawing processing unit 11 and a status register unit 15 for controlling the mask unit 14, both of which units are provided between the drawing processing unit 11 and the line buffer unit 13, and a timing generation unit 12 for controlling operation timing of the drawing processing unit 11, the line buffer unit 13 and the status register unit 15. In FIG. 1, illustration is made only of a characteristic part of the structure of the present embodiment and that of the remaining common part is omitted.

The graphics display device of the present embodiment is realized by the control of a CPU mounted on a computer system such as a personal computer or a machine dedicated to games by a computer program. The computer program is provided as storage in a storage medium such as a magnetic disk or a semiconductor memory. Load of the computer program into a control unit of the above-described computer system results in executing the function of the present embodiment.

The drawing processing unit 11, which is implemented, for example, by program-controlled CPU and internal memory such as a RAM, has a built-in graphics ROM which stores original data of display graphics, and conducts predetermined drawing processing in response to a clock signal CK and a drawing processing control signal CI output from the timing generation unit 12 to output graphic data composed of a display pixel data signal PD, a write enable signal WE to the line buffer unit 13 and an address signal LA indicative of an address of a storage position at the line buffer unit 13. Of the graphic data, the write enable signal WE is not applied directly to the line buffer 13 but is first applied to the mask unit 14. The address signal LA branches into two, one of which is applied to the line buffer unit 13 and the other to the status register unit 15.

The timing generation unit 12, which is implemented, for example, by program-controlled CPU and internal memory such as a RAM, receives input of the clock signal CK, and a vertical synchronizing signal V and a horizontal synchronizing signal H from a host device which is not shown and outputs the drawing processing control signal CI for controlling the operation timing of the drawing processing unit 11 and a line buffer control signal LC for controlling operation timing of the line buffer unit 13 and the status register unit 15.

The mask unit 14, which is implemented, for example, by program-controlled CPU and internal memory such as a RAM, supplies the write enable signal WE output from the drawing processing unit 11 to the line buffer unit 13 without masking (mask write enable signal MWE) or masks the same under control of the status register unit 15. In the present embodiment, the mask unit 14 is designed not to mask the applied write enable signal WE when a mask signal M output from the status register unit 15 is "0(h)", and mask the applied write enable signal WE when the mask signal M is "1(h)".

The status register unit 15, which is implemented, for example, by program-controlled CPU and internal memory such as a RAM, controls operation of the mask unit 14 according to the clock signal CK, the line buffer control signal LC output from the timing generation unit 12 and the address signal LA output from the drawing processing unit 11. More specifically, when an address value indicated by the address signal LA is the first one applied, the unit 15 sets the mask signal M to "0(h)" to control the mask unit 14 not to mask the write enable signal WE and stores the address value. On the other hand, when the same address value as that indicated by the address signal LA is already stored, the unit 15 sets the mask signal M to "1(h)" to control the mask unit 14 to mask the write enable signal WE.

The line buffer unit 13, which is implemented, for example, by a semiconductor memory such as a RAM, temporarily stores the display pixel data PD output from the drawing processing unit 11, the mask write enable signal MWE which has passed through the mask unit 14 and the address signal LA in response to the clock signal CK and the line buffer control signal LC output from the timing generation unit 12.

Figure 2:
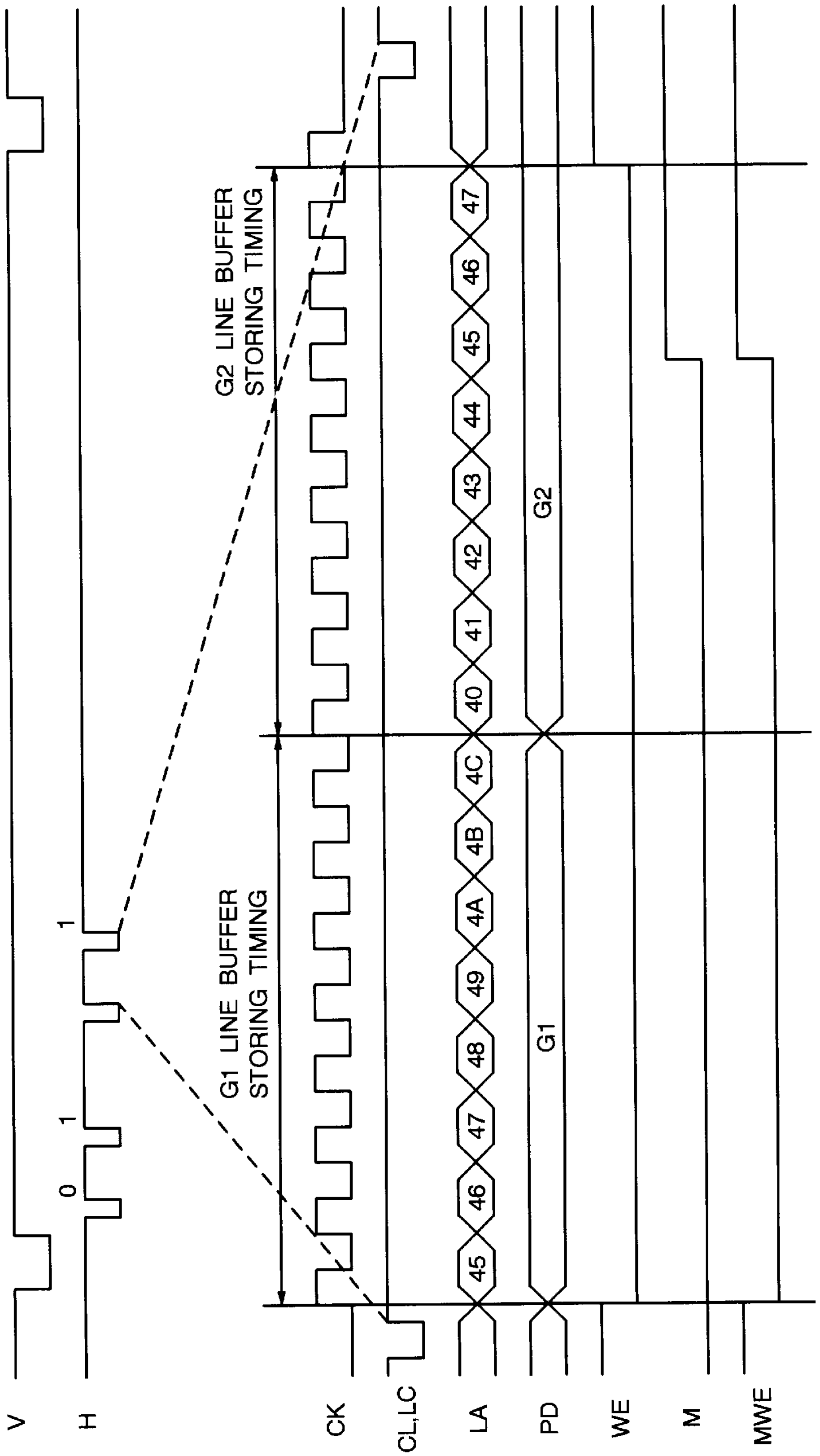
FIG. 2 is a time chart showing a signal waveform corresponding to graphics display operation for one frame according to the present embodiment.
Figure 3:
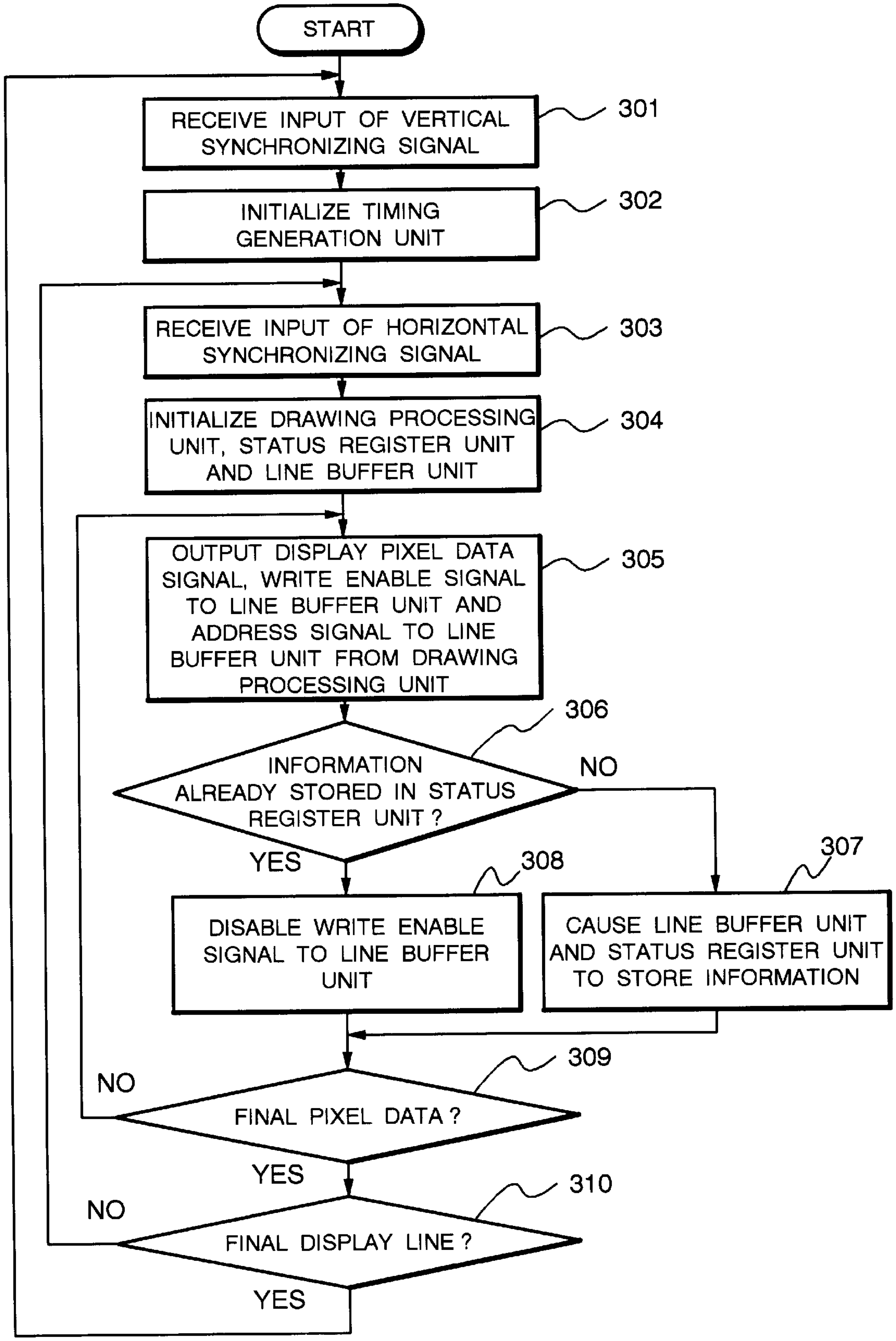
FIG. 3 is a flow chart showing operation of the present embodiment.
Figure 9:
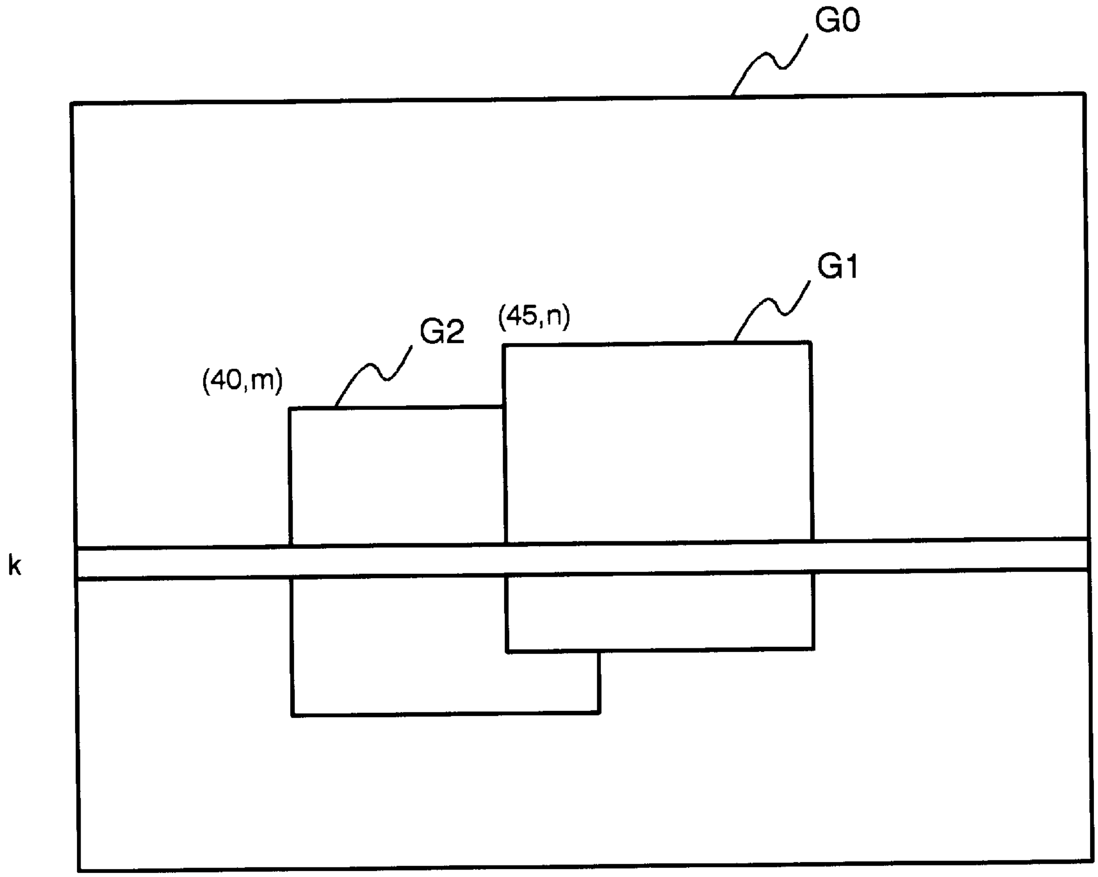
FIG. 9 ( PRIOR ART )
FIG. 9 is a diagram for use in schematically explaining an example of display of graphics in stereoscopic display.
Figure 10:
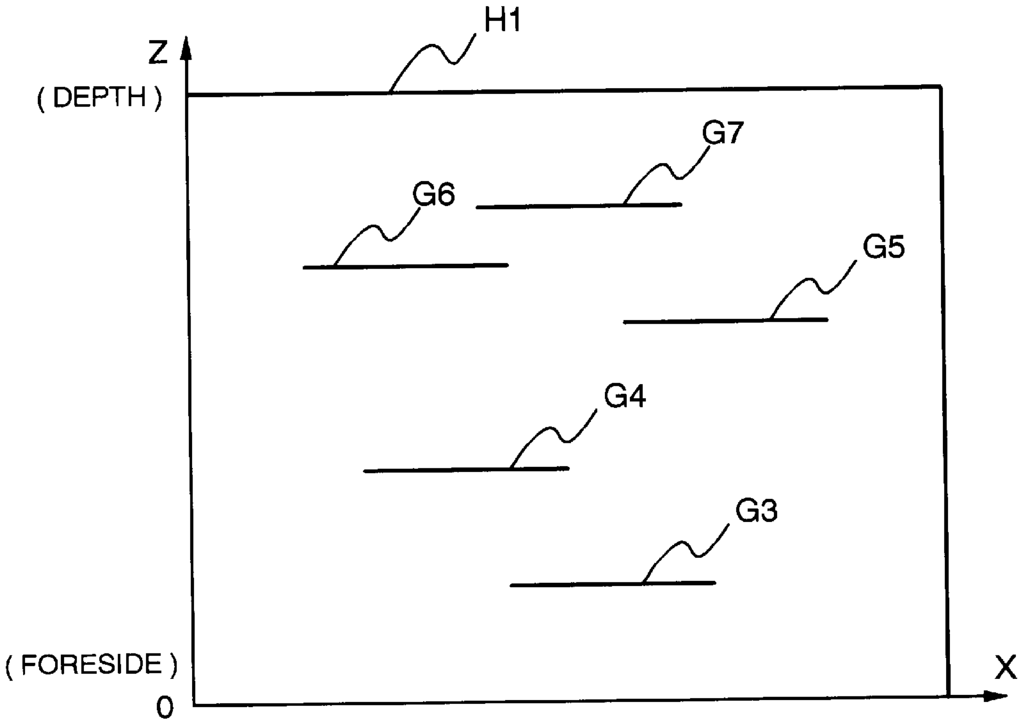
FIG. 10 (PRIOR ART)
FIG. 10 is a diagram for use in schematically explaining a positional relationship among display graphics in stereoscopic display and its corresponding display example.
Figure 10:
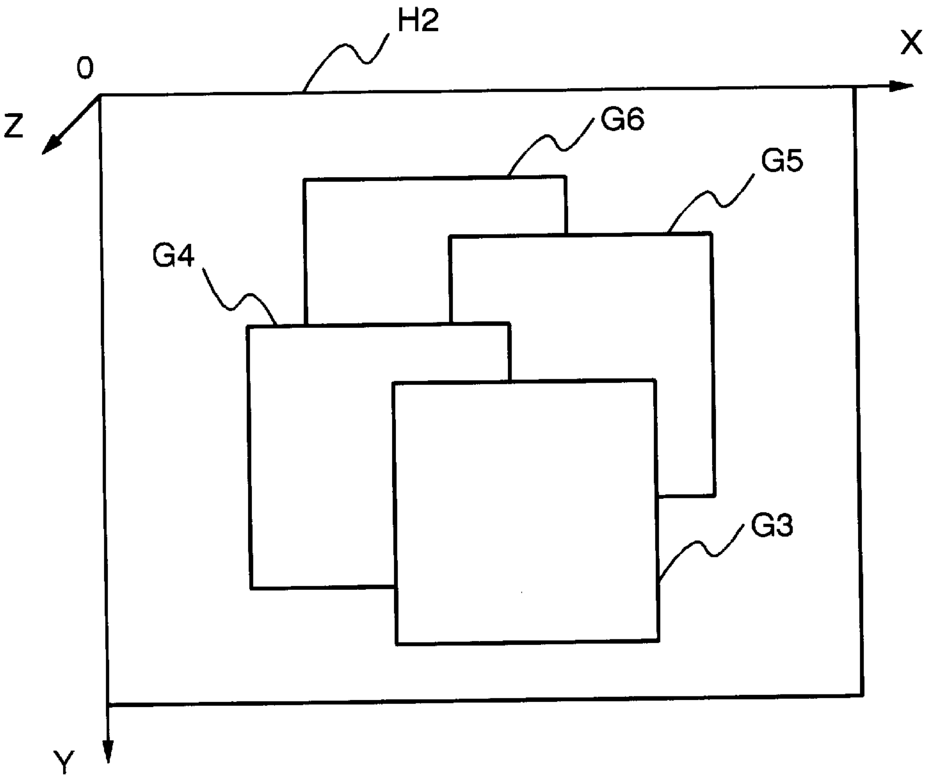
FIG. 10 (PRIOR ART)
Figure 11:
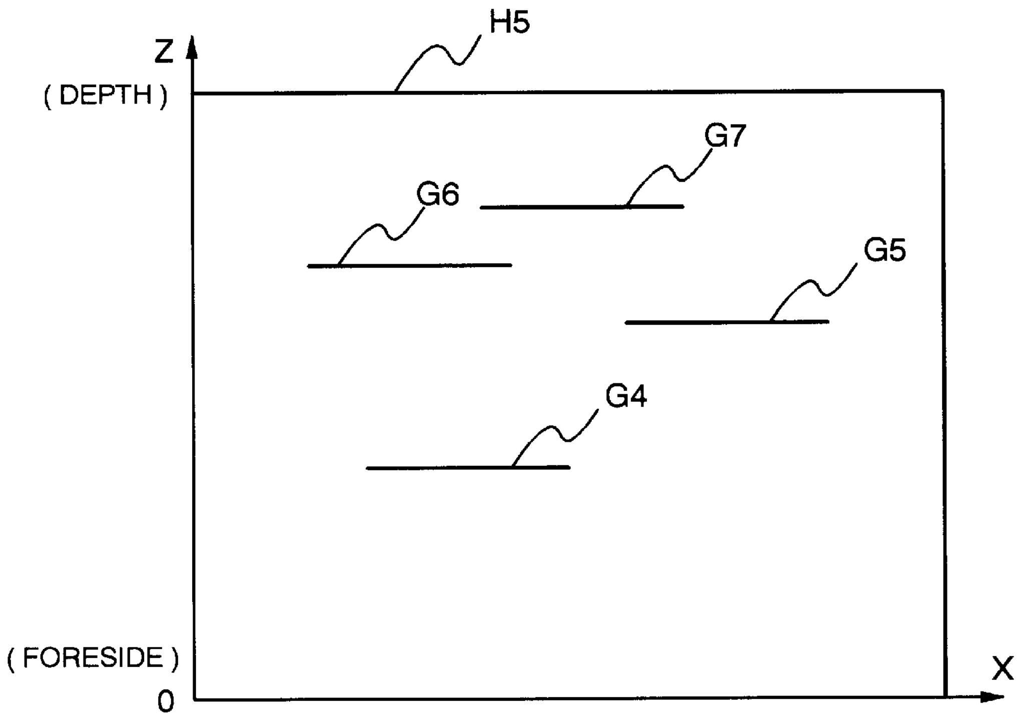
FIG. 11 (PRIOR ART)
FIG. 11 is a diagram for use in schematically explaining a positional relationship among display graphics in stereoscopic display and its corresponding display example, which diagram shows the state of drawing made exceeding the drawing capacity.
Figure 11:
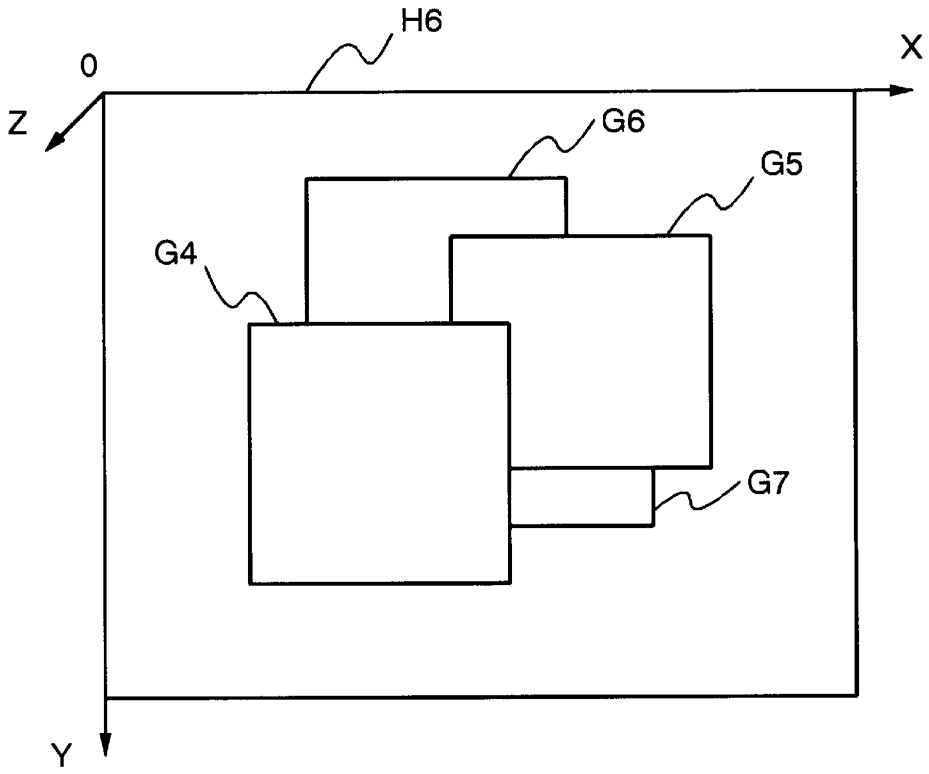
FIG. 11 (PRIOR ART)

Description will be next made of operation of the graphics display device of the present embodiment for displaying a k-th line of graphics with reference to FIGS. 1, 2 and 3. FIG. 2 is a time chart showing each of signal waveforms and FIG. 3 is a flow chart showing a processing procedure. It is assumed that graphics to be displayed are those shown in FIG. 9. More specifically, graphics G1 and G2 are displayed, with the graphics G1 disposed in the foreground (given higher display priority).

First, the graphics display device 10 is supplied with the vertical synchronizing signal V from the host device (Step 301) to initialize the timing generation unit 12 (Step 302). Then, the timing generation unit 12 is supplied with the horizontal synchronizing signal H once from the host device (Step 303) to responsively output the drawing processing control signal CI and the line buffer control signal LC. The drawing processing unit 11 is initialized in response to the drawing processing control signal CI, while the line buffer unit 13 and the status register unit 15 are initialized in response to the line buffer control signal LC to enter a drawing starting state (Step 304).

Upon entering the drawing starting state, the drawing processing unit 11, for first displaying the graphics G1 in the foreground whose display priority is high, serially outputs the address signal LA="45~4C(h)" and the corresponding display pixel data signal PD as a pixel data value for drawing the graphics G1 in response to each clock signal CK (Step 305). During this period, the write enable signal WE attains "0(h)". The status register unit 15 receives input of the address signal LA="45~4C(h)" and since the address value is the first one applied, the unit 15 outputs the mask signal M="0(h)" to store the address value during this period (Steps 306 and 307). The mask unit 14 outputs the applied write enable signal WE as the mask write enable signal MWE without masking in response to the mask signal M="0(h)" output from the status register unit 15. As a result, the pixel data of the graphics G1 is stored in the line buffer unit 13 (Step 307).

Next, the drawing processing unit 11, for subsequently displaying the graphics G2 disposed at the back whose display priority on the same line is low, serially outputs the address signal LA="40~47(h)" and the corresponding pixel data signal PD as a pixel data value for drawing the graphics G2 in response to each clock signal CK (Steps 309 and 305). During this period, the write enable signal WE attains "0(h)". The status register unit 15 receives input of the address signal LA="40~47(h)" and as to the address signal LA="40~44(h)", since the address value is the first one applied, the unit 15 outputs the mask signal M="0(h)" to store the address value during this period (Steps 306 and 307). As to the address signal LA="45~47(h)", since the address value is already stored, the unit 15 outputs the mask signal M="1(h)" during this period (Step 306). As a result, the mask write enable signal MWE is output from the mask unit 14 only in the period of the address signal LA="40~44 (h)", so that the display pixel data signal PD corresponding to the address signal is stored in the line buffer 13 as the pixel data of the graphics G2 (Steps 307 and 308).

After the one line of pixel data is thus stored in the line buffer 13, the pixel data is output and displayed on the display device. Then, the same processing will be repeated for each display line (Steps 309 and 310). After the processing reaches the final display line, the graphics display device is again supplied with the vertical synchronizing signal V from the host device (Step 301) to proceed to a processing cycle for display the next screen.

Figure 4:
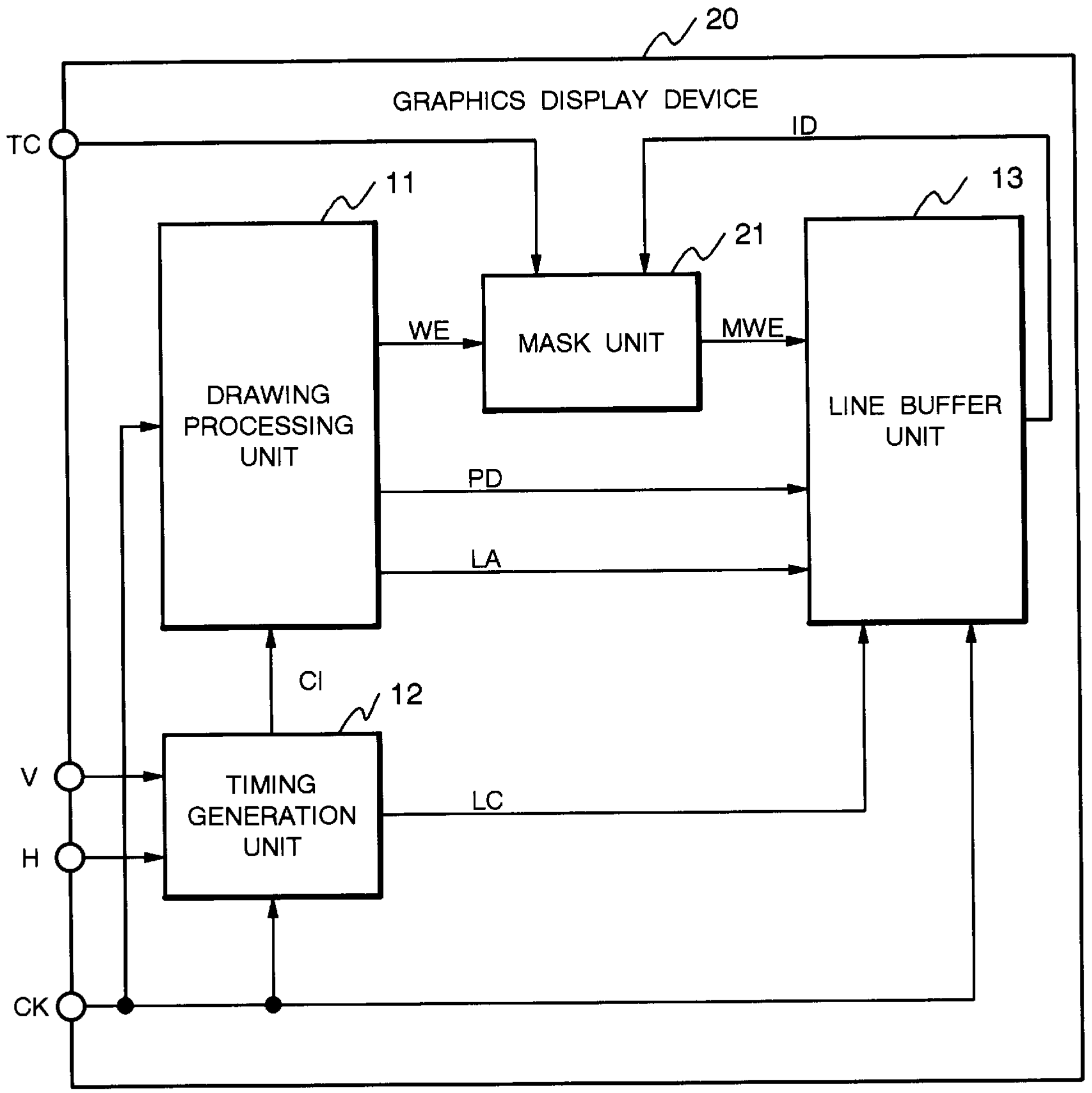
FIG. 4 is a block diagram showing structure of a graphics display device according to another embodiment of the present invention.

FIG. 4 is a block diagram showing structure of a graphics display device according to another embodiment of the present invention. With reference to FIG. 4, a graphics display device 20 of the present embodiment includes a drawing processing unit 11 for generating and outputting graphic data, a line buffer unit 13 for accumulating and outputting one line of graphic data output from the drawing processing unit 11, a mask unit 21 provided between the drawing processing unit 11 and the line buffer unit 13 for masking part of graphic data output from the drawing processing unit 11, and a timing generation unit 12 for controlling operation timing of the drawing processing unit 11 and the line buffer unit 13. In FIG. 4, illustration is made only of a characteristic part of the structure of the present embodiment and that of the remaining common part is omitted.

The graphics display device of the present embodiment is realized by the control of a CPU mounted on a computer system such as a personal computer or a machine dedicated to games by a computer program. The computer program is provided as storage in a storage medium such as a magnetic disk or a semiconductor memory. Load of the computer program into a control unit of the above-described computer system results in executing the function of the present embodiment.

In the above-described structure, the drawing processing unit 11, the timing generation unit 12 and the line buffer unit 13 are the same as their counterpart components in the first embodiment shown in FIG. 1, and therefore the same reference numerals are allotted thereto to omit their description.

The mask unit 21, which is implemented, for example, by program-controlled CPU and internal memory such as a RAM, receives input of and compares a transparent color signal TC which is set by a host device not shown for designating data corresponding to a transparent color and a display graphic data signal ID output from the line buffer unit 13, which is a data signal related to a display screen to be actually displayed on a display device, and masks a write enable signal WE to output a mask write enable signal MWE based on the comparison results. More specifically, when the transparent color signal TC and the display graphic data signal ID coincide with each other, the mask unit 21 outputs the applied write enable signal WE without masking and stores the same in the line buffer unit 13. On the other hand, when the transparent color signal TC and the display graphic data signal ID fail to coincide with each other, the unit 21 masks the applied write enable signal WE.

Figure 5:
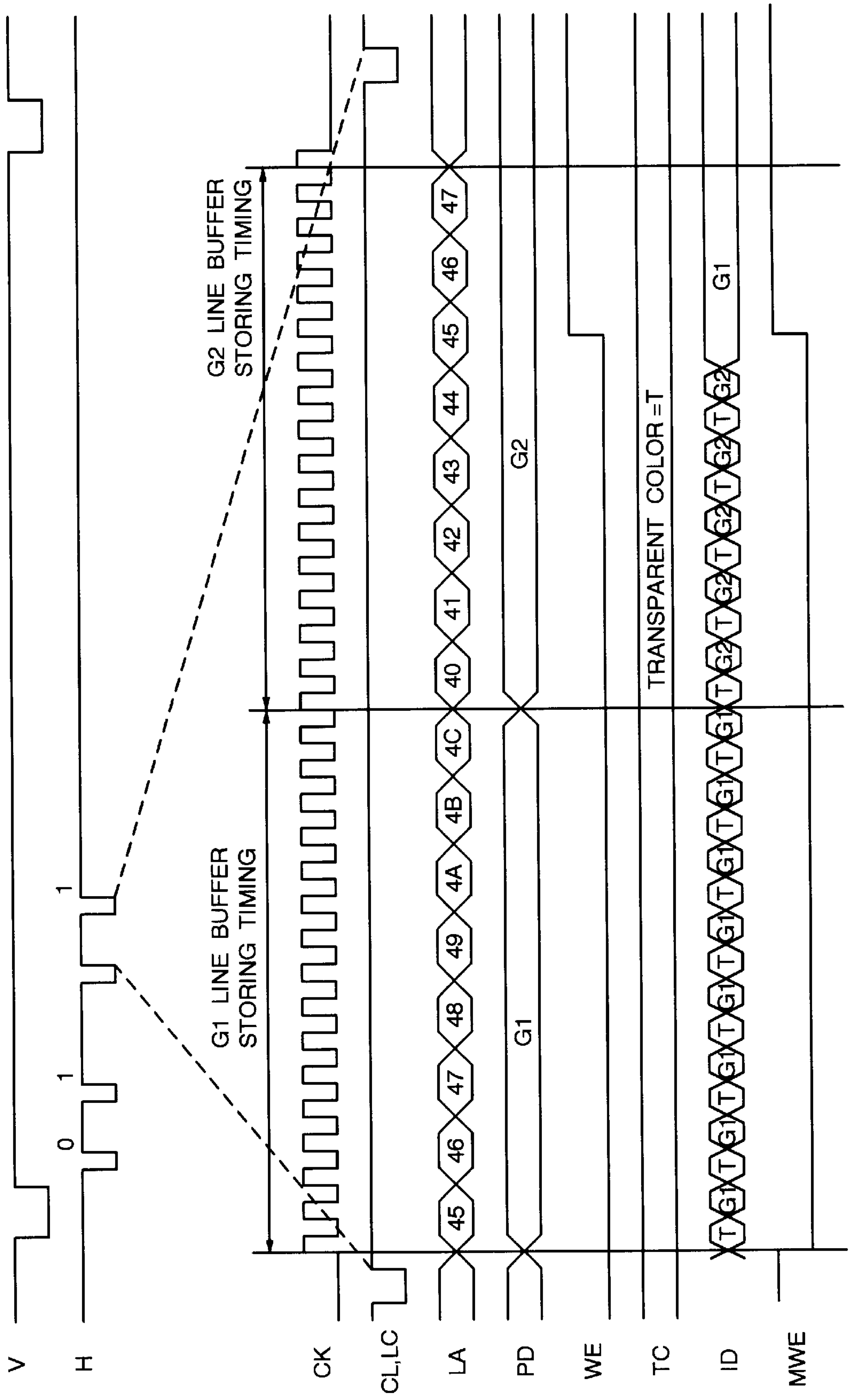
FIG. 5 is a time chart showing a signal waveform corresponding to graphics display operation for one frame according to the present embodiment.
Figure 6:
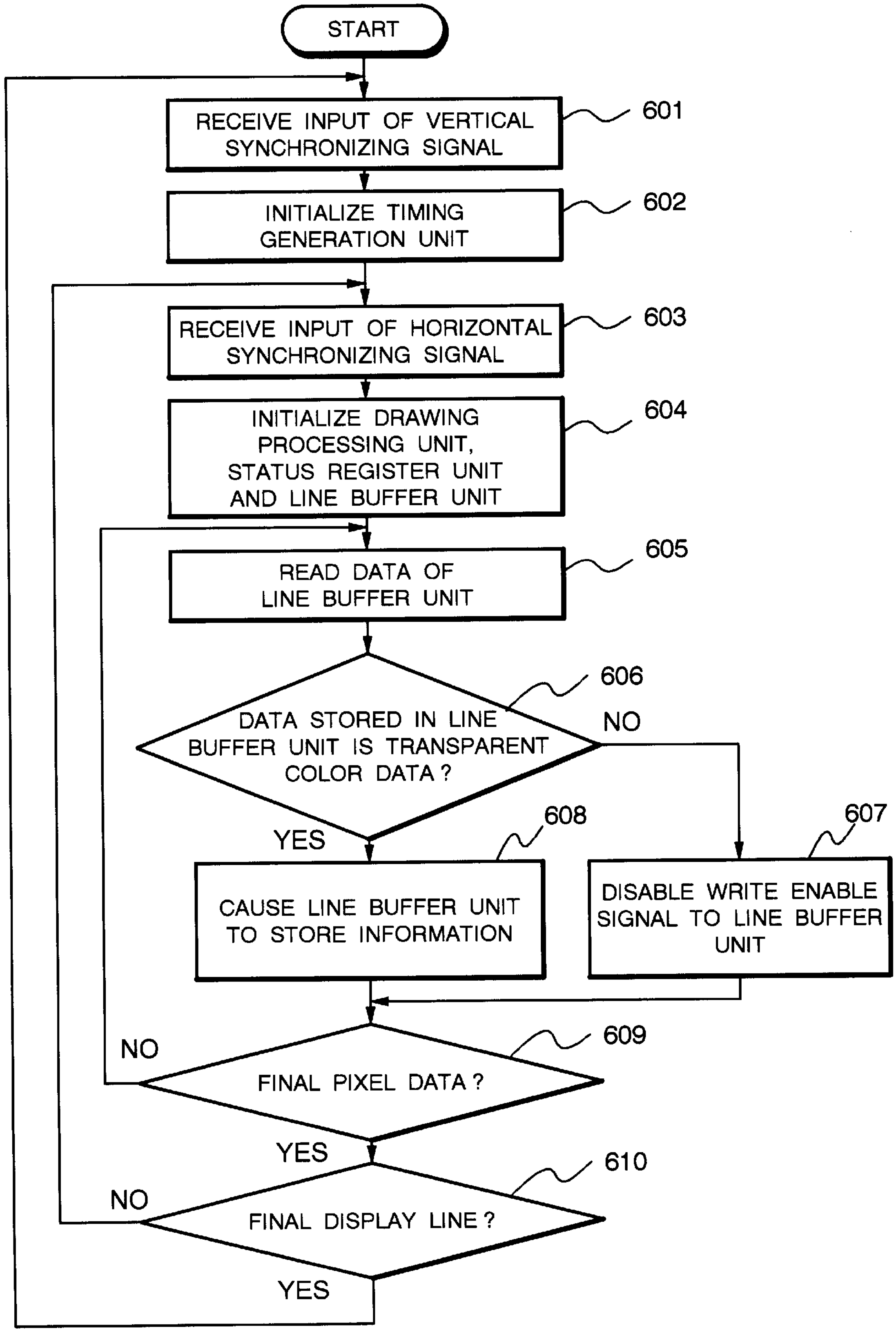
FIG. 6 is a flow chart showing operation of the present embodiment.
Figure 7:
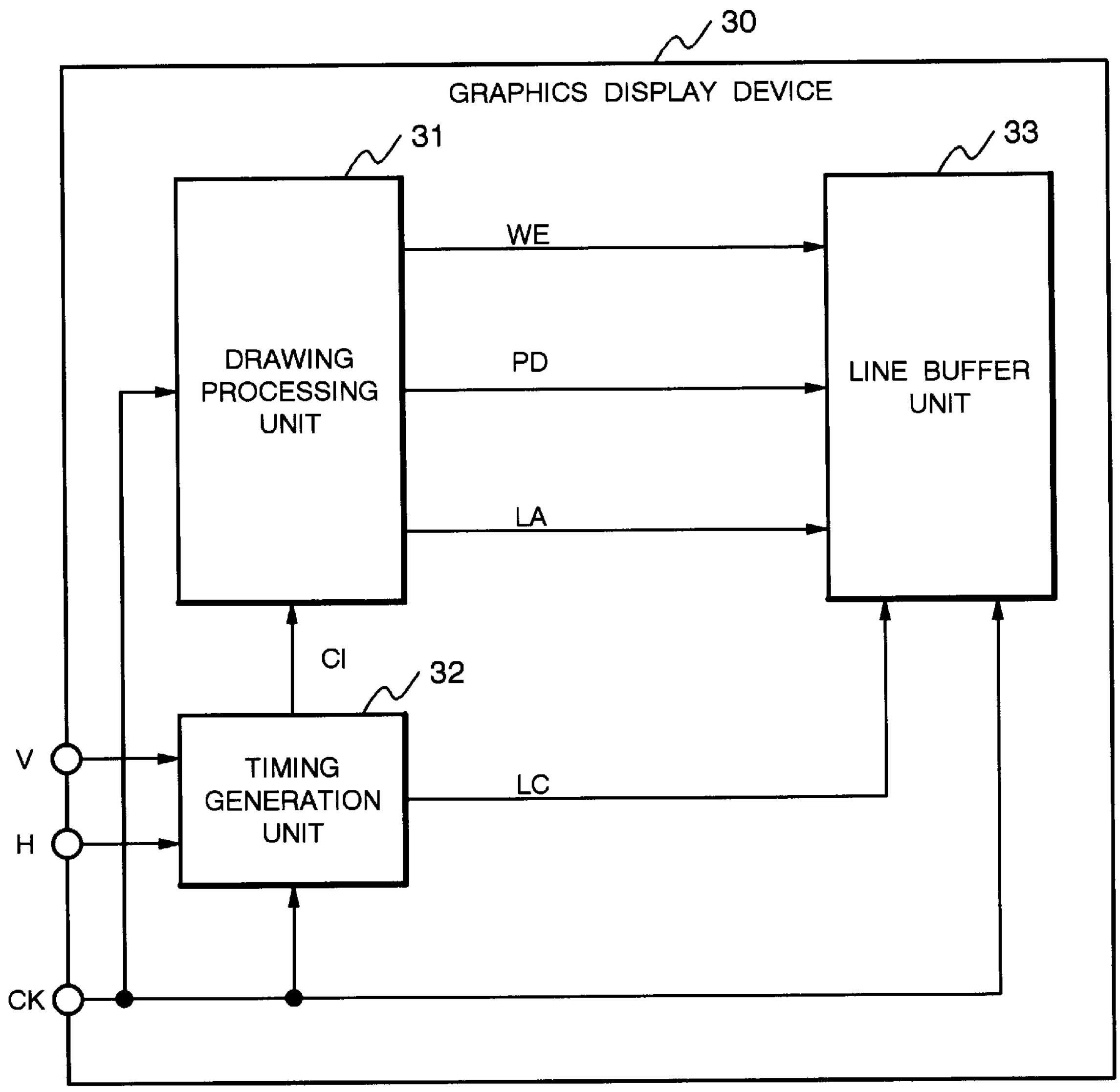
FIG. 7 ( PRIOR ART )
FIG. 7 is a block diagram showing structure of a conventional graphics display device.
Figure 8:
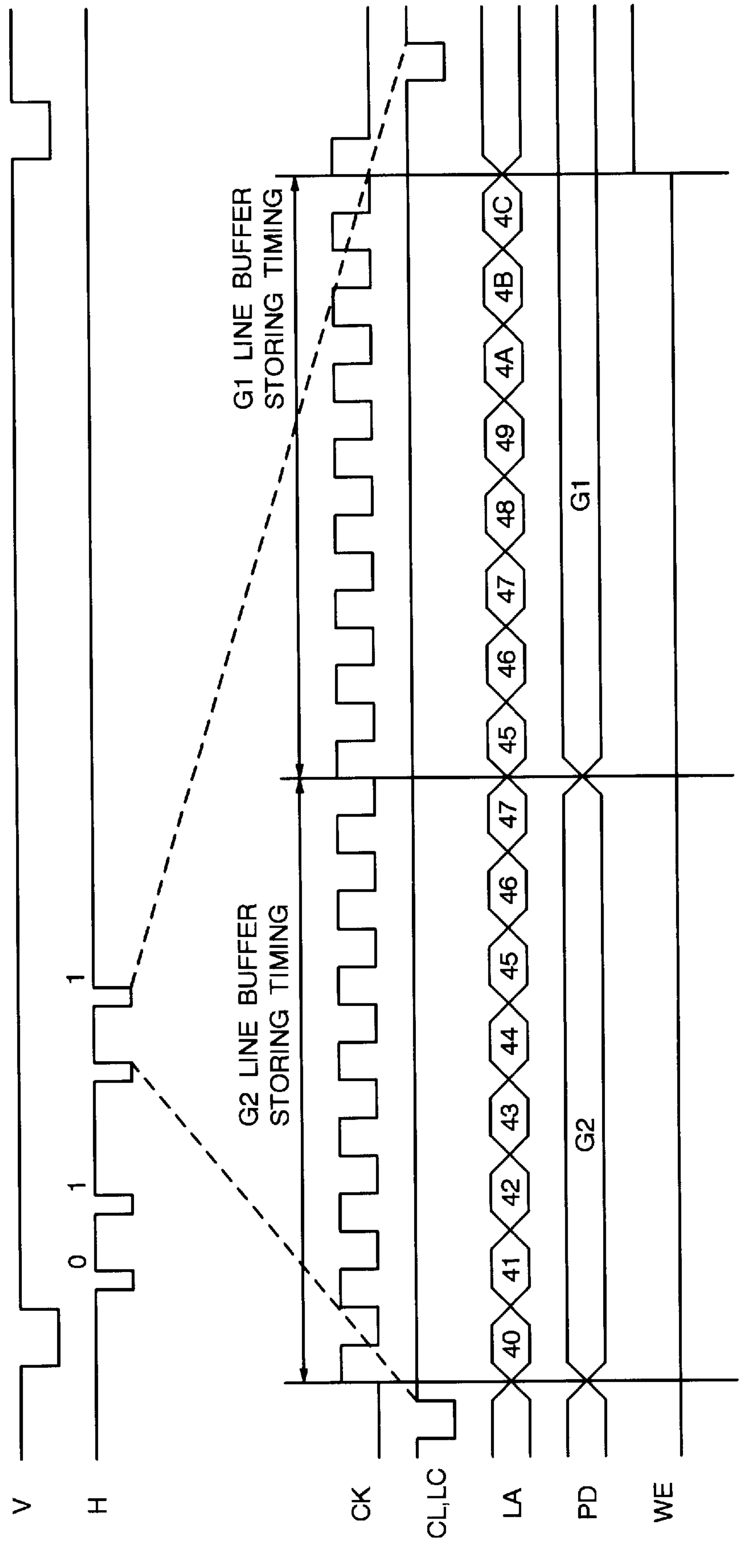
FIG. 8 (PRIOR ART)
FIG. 8 is a time chart showing a signal waveform corresponding to graphics display operation for one frame at the conventional graphics display device.

Description will be next made of operation of the graphics display device of the present embodiment for displaying a k-th line of graphics with reference to FIGS. 4, 5 and 6. FIG. 5 is a time chart showing each of signal waveforms and FIG. 6 is a flow chart showing a processing procedure. It is assumed that graphics to be displayed are those shown in FIG. 9. More specifically, graphics G1 and G2 are displayed, with the graphics G1 disposed in the foreground (given higher display priority).

First, following the same procedure as that in the first embodiment shown in FIG. 3, the graphics display device 20 initializes the timing generation unit 12, the drawing processing unit 11 and the line buffer 13 in response to the supply of the vertical synchronizing signal V and the horizontal synchronizing signal H (Steps 601–604). At the initialization, all the data of the line buffer unit 13 is assumed to be set to a value "T(h)" supplied by the transparent color signal TC. The value "T(h)" is assumed to be an arbitrary value set by a host device (not shown).

Upon entering the drawing starting state after the initialization, the drawing processing unit 11, for displaying pixel data of the left end of the graphics G1 located in the foreground whose display priority is high, outputs the address signal LA="45(h)", as well as supplying the write enable signal WE="1(h)" to the mask unit 21 in synchronization with the clock signal CK. Responsively, the mask unit 21 reads the display graphic data signal ID="T(h)" stored in the line buffer unit 13 (Step 605). Since in this cycle the value "T(h)" of the transparent color signal TC and the value "T(h)" of the applied display graphic data signal ID are the same, the mask unit 21 is set not to mask the write enable signal WE. Then, in response to the next clock signal CK, the drawing processing unit 11 outputs the write enable signal WE="0(h)" and the mask unit 21 outputs the write enable signal WE as the mask write enable signal MWE="0(h)" without masking. As a result, the display pixel data signal PD output from the drawing processing unit 11 is stored in the line buffer unit 13 (Steps 606 and 608).

In the processing cycle for displaying the graphics GI, since no stored data exists in the line buffer unit 13, the foregoing operation will be repeated during the period of the address signal LA="45~4C(h)" (Step 609). As a result, the pixel data of the graphics G1 is stored in the line buffer unit 13.

Next, the drawing processing unit 11, for subsequently displaying pixel data PD of the left end of the graphics G2 located at the back whose display priority on the same line is low, outputs the address signal LA="40(h)", as well as supplying the write enable signal WE="1(h)" to the mask unit 21 in synchronization with the clock signal CK. The mask unit 21 responsively reads the display graphic data signal ID="T(h)" stored in the line buffer unit 13 (Step 605). In this cycle, since the value "T(h)" of the transparent color signal TC and the value "T(h)" of the applied display graphic data signal ID are the same, the mask unit 21 is set not to mask the write enable signal WE. Then, in response to the next clock signal CK, the drawing processing unit 11 outputs the write enable signal WE="0(h)" and the mask unit 21 outputs the write enable signal WE as the mask write enable signal MWE="0(h)" without masking. As a result, the display pixel data signal PD output from the drawing processing unit 11 is stored in the line buffer unit 13 (Steps 606 and 608).

In the processing cycle for displaying the graphics G2, no stored data exists in the line buffer 13 during the period of the address signal LA="40~44(h)". By the end of the period of the address signal LA="40~44(h)", therefore, the foregoing operation will be repeated (Step 609).

Then, when the address signal LA assumes "45(h)", processing contents will differ because pixel data is stored in the line buffer unit 13 in the processing cycle for displaying the graphics G1. First, the drawing processing unit 11 supplies the write enable signal WE="1(h)" to the mask unit 21 in synchronization with the clock signal CK. The mask unit 21 responsively reads the display graphic data signal ID="G1(h)" stored in the line buffer 13 (Step 605). In this cycle, since the value "T(h)" of the transparent color signal T and the vale "G1(h)" of the applied display graphic data signal ID differ from each other, the mask unit 21 is set to mask the write enable signal WE. Then, in response to the next clock signal CK, the drawing processing unit 11 outputs the write enable signal WE="0(h)" and the mask unit 21 masks the write enable signal WE to output the mask write enable signal MWE="1(h)". As a result, the display pixel data signal PD output from the drawing processing unit 11 is not stored in the line buffer unit 13 (Steps 606 and 607).

In the processing cycle for displaying the graphics G2, since with the address signal LA="45~47(h)", the pixel data of the graphics G1 is already stored in the line buffer 13, the foregoing operation will be repeated during the period of the address signal LA="45~47(h)" (Step 609).

After the one line of pixel data is thus stored in the line buffer unit 13, the pixel data is output and displayed on the display device. Then, the same processing will be repeated for each display line (Steps 609 and 610). When the processing reaches the final display line, the graphics display device again receives supply of the vertical synchronizing signal V from the host device (Step 601) to proceed to a processing cycle for display the next screen.

As described in the foregoing, in stereoscopic display in which a plurality of graphics are displayed overlapping with each other in the depth direction, by sequentially displaying the graphics, starting with a graphics located in the foreground toward a graphics located at the back and controlling a mask means for making a write enable signal so as to inhibit drawing of an overlapping part of the graphics located at the back, the graphics display device of the present invention and the graphics display method thereof allow even numerous graphics overlapping with each other in the depth direction to be expressed in appropriate stereoscopic display without exceeding a drawing capacity of the graphics display device.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A graphics display device having a built-in graphics ROM which stores original data of display graphics for appropriately overlapping and drawing a plurality of graphic data having a positional relationship in the depth direction on the same screen, comprising:

drawing processing means for conducting predetermined drawing processing in response to a clock signal to output a display pixel data signal, a write enable signal and an address signal sequentially with respect to target graphics, starting with a graphics located in the foreground in the positional relationship in the depth direction toward a graphics located at the back;

mask means for receiving input of said write enable signal output from said drawing processing means to, when a predetermined region of a target graphics overlaps with other graphics located in the foreground of the target graphics, mask and output said write enable signal corresponding to the region;

line buffer means responsive to said clock signal for accumulating and outputting one line of said display pixel data and said address signal output from said drawing processing means and said write enable signal which has passed through said mask means; and timing generation means for controlling operation timing of said drawing processing means and said line buffer means based on said clock signal, and a vertical synchronizing signal and a horizontal synchronizing signal.

2. The graphics display device as set forth in claim 1, wherein said mask means when it receives input of said write enable signal corresponding to first of said display pixel data for a predetermined region of a display screen, outputs the write enable signal without masking, and when it receives input of said write enable signal corresponding to said display pixel data for a region where said display pixel data already exists, masks the write enable signal.

3. The graphics display device as set forth in claim 1, further comprising status register means whose operation timing is controlled by said timing generation means for controlling said mask means based on said clock signal and said address signal, wherein said status register means when no address value coincident with an address value of applied said address signal is stored, controls said mask means to output applied said write enable signal without masking, as well as storing the address value of the address signal, and when the address value of applied said address signal coincides with an already stored address value, controls said mask means to mask applied said write enable signal.

4. The graphics display device as set forth in claim 1, wherein said mask means compares a value of predetermined display pixel data set in advance and a value of display graphic data output from said line buffer means, outputs applied said write enable signal without masking when the values of both the data coincide with each other, and masks applied said write enable signal when the values of both the data fail to coincide with each other.

5. The graphics display device as set forth in claim 1, wherein said mask means compares a value of said display pixel data corresponding to a transparent color and a value of display graphic data output from said line buffer means, outputs applied said write enable signal without masking when the values of both the data coincide with each other, and masks applied said write enable signal when the values of both the data fail to coincide with each other.

6. A graphics display method of appropriately overlapping and drawing a plurality of graphic data having a positional relationship in the depth direction on the same screen, comprising the steps of:

conducting predetermined drawing processing in response to a clock signal to output a display pixel data signal, a write enable signal and an address signal sequentially with respect to target graphics, starting with a graphics located in the foreground in the positional relationship in the depth direction toward a graphics located at the back;

receiving input of said write enable signal output at said drawing processing step to, when a predetermined region of a target graphics overlaps with other graphics located in the foreground of the target graphics, mask and output said write enable signal corresponding to the region; and accumulating and outputting one line of said display pixel data and said address signal output at said drawing processing step and said write enable signal which has been subjected to said write enable signal masking step in response to said clock signal.

7. The graphics display method as set forth in claim 6, wherein said write enable signal masking step comprises the steps of:

determining whether applied said write enable signal is said write enable signal corresponding to first of said display pixel data for a predetermined region of a display screen, and when applied said write enable signal corresponds to first of said display pixel data for said predetermined region, outputting the write enable signal without masking, and when applied said write enable signal corresponds to said display pixel data for a region where said display pixel data already exists, masking the write enable signal.

8. The graphics display method as set forth in claim 6, wherein said write enable signal masking step comprises the steps of:

receiving input of said address signal output at said drawing processing step and comparing an address value of the address signal and an address value at which said display pixel data already exists, and when said address values fail to coincide with each other, outputting applied said write enable signal without masking and when said address values coincide with each other, masking applied said write enable signal.

9. The graphics display method as set forth in claim 6, wherein said write enable signal masking step comprises the steps of:

comparing a value of predetermined display pixel data set in advance and a value of display graphic data output in said accumulating and outputting step, and outputting applied said write enable signal without masking when the values of both the data coincide with each other, and masking applied said write enable signal when the values of both the data fail to coincide with each other.

10. The graphics display method as set forth in claim 6, wherein said write enable signal masking step comprises the steps of:

comparing a value of said display pixel data corresponding to a transparent color and a value of display graphic data output in said accumulating and outputting step, and outputting applied said write enable signal without masking when the values of both the data coincide with each other, and masking applied said write enable signal when the values of both the data fail to coincide with each other.

11. A computer readable memory having a graphics display control program for controlling a computer system for appropriately overlapping and drawing a plurality of graphic data having a positional relationship in the depth direction on the same screen, said graphics display control program comprising the steps of:

conducting predetermined drawing processing in response to a clock signal to output a display pixel data signal, a write enable signal and an address signal sequentially with respect to target graphics, starting with a graphics located in the foreground in the positional relationship in the depth direction toward a graphics located at the back;

receiving input of said write enable signal output at said drawing processing step to, when a predetermined region of a target graphics overlaps with other graphics located in the foreground of the target graphics, mask and output said write enable signal corresponding to the region; and accumulating and outputting one line of said display pixel data and said address signal output at said drawing processing step and said write enable signal which has been subjected to said write enable signal masking step in response to said clock signal.

12. The computer readable memory as set forth in claim 11, wherein said write enable signal masking step in said graphics display control program comprises the steps of:

determining whether applied said write enable signal is said write enable signal corresponding to first of said display pixel data for a predetermined region of a display screen, and when applied said write enable signal corresponds to first of said display pixel data for said predetermined region, outputting the write enable signal without masking, and when applied said write enable signal corresponds to said display pixel data for a region where said display pixel data already exists, masking the write enable signal.

13. The computer readable memory as set forth in claim 11, wherein said write enable signal masking step in said graphics display control program comprises the steps of:

receiving input of said address signal output at said drawing processing step and comparing an address value of the address signal and an address value at which said display pixel data already exists, and when said address values fail to coincide with each other, outputting applied said write enable signal without masking and when said address values coincide with each other, masking applied said write enable signal.

14. The computer readable memory as set forth in claim 11, wherein said write enable signal masking step in said graphics display control program comprises the steps of:

comparing a value of predetermined display pixel data set in advance and a value of display graphic data output in said accumulating and outputting step, and outputting applied said write enable signal without masking when the values of both the data coincide with each other, and masking applied said write enable signal when the values of both the data fail to coincide with each other.

15. The computer readable memory as set forth in claim 11, wherein said write enable signal masking step in said graphics display control program comprises the steps of:

comparing a value of said display pixel data corresponding to a transparent color and a value of display graphic data output in said accumulating and outputting step, and outputting applied said write enable signal without masking when the values of both the data coincide with each other, and masking applied said write enable signal when the values of both the data fail to coincide with each other.

* * * * *

UNITED STATES PATENT AND TRADEMARK OFFICE

CERTIFICATE OF CORRECTION

PATENT NO. : 6,037,953
DATED : March 14, 2000
INVENTOR(S) : Kenichi Mizutani

It is certified that error appears in the above-identified patent and that said Letters Patent is hereby corrected as shown below:

Title page,
Item [56], References Cited, U.S. PATENT DOCUMENTS, insert
-- 4,868,557 9/1999 Stephen G. Perlman
5,557,302 9/1996 Adam Levinthal --

Signed and Sealed this

Twenty-second Day of October, 2002

*Attest:*

JAMES E. ROGAN

*Attesting Officer* *Director of the United States Patent and Trademark Office*